US010959578B2

(12) United States Patent
Huang et al.

(10) Patent No.: US 10,959,578 B2
(45) Date of Patent: Mar. 30, 2021

(54) COOKWARE ARTICLE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 61 days.

(21) Appl. No.: 16/259,153

(22) Filed: Jan. 28, 2019

(65) Prior Publication Data
US 2020/0237162 A1 Jul. 30, 2020

(51) Int. Cl.
*A47J 45/07* (2006.01)
*A47J 27/00* (2006.01)

(52) U.S. Cl.
CPC ........... *A47J 45/071* (2013.01); *A47J 27/002* (2013.01)

(58) Field of Classification Search
CPC ........ A47J 45/071; A47J 45/061; A47J 45/07; A47J 27/002; B65D 23/10; B65D 2525/28
USPC ............ 220/573.1, 912, 573.2, 573.3, 573.4, 220/573.5, 759, 770; 294/6, 12, 27.1, 30, 294/57
See application file for complete search history.

(56) References Cited

U.S. PATENT DOCUMENTS

| 2,613,978 | A | * | 10/1952 | Marulli | A47J 45/10 |
| | | | | | 294/27.1 |
| 3,297,349 | A | * | 1/1967 | Pryce | A47J 45/071 |
| | | | | | 294/2 |
| 3,342,517 | A | * | 9/1967 | Pryce | A47J 45/071 |
| | | | | | 294/27.1 |

(Continued)

FOREIGN PATENT DOCUMENTS

| CN | 101209191 A | 7/2008 |
| CN | 202234726 U | 5/2012 |

(Continued)

OTHER PUBLICATIONS

Examination report for TW108100096, dated Sep. 20, 2019, Total of 4 pages.

(Continued)

*Primary Examiner* — Robert Poon
(74) *Attorney, Agent, or Firm* — Tracy M. Heims; Apex Juris, PLLC.

(57) ABSTRACT

A cookware article includes a container, a fixed handle, and a removable handle. The fixed handle is mounted on a side wall of the container. The fixed handle has an opening for the removable handle to insert. A fixed portion and a grip portion are formed on two sides of the opening respectively. The removable handle has a grip segment and an engaging segment. The engaging segment has a first abutting portion, a second abutting portion, and a connecting portion between the first abutting portion and the second abutting portion. When the removable handle is engaged with the fixed handle through the engagement segment, the connecting portion is inserted in the opening so that the first abutting portion is abutted against the fixed portion, the second abutting portion is abutted against the grip portion. As such, the removable handle supports the container.

8 Claims, 9 Drawing Sheets

(56) References Cited

U.S. PATENT DOCUMENTS

| | | | | |
|---|---|---|---|---|
| 4,471,985 | A * | 9/1984 | Mahoney | A47J 37/0786 294/10 |
| 5,251,944 | A * | 10/1993 | Truitt | B65G 7/12 294/15 |
| 5,887,751 | A * | 3/1999 | Kroscher | A47J 45/071 220/573.1 |
| 6,000,739 | A * | 12/1999 | Zemit | A47J 45/10 126/25 R |
| 6,250,493 | B1 * | 6/2001 | Kwan | A47J 45/071 220/759 |
| 6,393,973 | B1 * | 5/2002 | Velo | A47J 45/071 16/111.1 |
| 2005/0145637 | A1 * | 7/2005 | Lin | A47J 45/071 220/759 |
| 2006/0130669 | A1 * | 6/2006 | Crow | A47J 45/061 99/403 |
| 2008/0006645 | A1 * | 1/2008 | Sup | A47J 45/071 220/759 |
| 2014/0076911 | A1 * | 3/2014 | Bogani | A47J 45/071 220/759 |
| 2014/0151381 | A1 * | 6/2014 | Bogani | A47J 27/002 220/573.1 |
| 2015/0053696 | A1 * | 2/2015 | Borovicka | A47J 45/071 220/573.1 |
| 2016/0331183 | A1 * | 11/2016 | Paul | A47J 45/071 |
| 2017/0319012 | A1 * | 11/2017 | Dodane | A47J 45/071 |
| 2018/0184851 | A1 * | 7/2018 | Koke | A47J 45/071 |

FOREIGN PATENT DOCUMENTS

| | | |
|---|---|---|
| CN | 204033184 U | 12/2014 |
| CN | 207912603 U | 9/2018 |
| FR | 3016786 A1 | 7/2015 |
| TW | M253311 U | 12/2004 |
| TW | M281582 U | 12/2005 |
| TW | 201739397 A | 11/2017 |

OTHER PUBLICATIONS

Search report for TW108100096, dated Sep. 20, 2019, Total of 1 page.
English Abstract for TW201739397, Total of 1 page.
English Abstract for TWM253311, Total of 1 page.
English Abstract for TWM281582, Total of 1 page.
Search report for CN201910037421.4, dated Dec. 15, 2020, Total of 2 pages.
English abstract for CN101209191, Total of 1 page.
English abstract for CN202234726, Total of 1 page.
English abstract for CN204033184, Total of 1 page.
English abstract for CN207912603, Total of 1 page.
English abstract for FR3016786, Total of 1 page.

* cited by examiner

COOKWARE ARTICLE

BACKGROUND OF THE INVENTION

Technical Field

The present disclosure is related to a cookware, and, more particularly, to a cookware article with a removable handle.

Description of Related Art

The cookware is the necessary appliance for preparing daily meals. No matter what the cooking manner is, such as sautéing, boiling, frying, deep-frying, baking, it is always necessary to use the cookware. During cooking, the container of the cookware is directly in contact with the heat source for gaining enough heat to turn the raw food therein into a steaming hot dish. Most of the cookware is made of metal which has a good heat conductivity so once the container of the cookware is heated, the heat will soon reach all parts of the cookware, including the handle. Therefore, as the heating time of the cookware increases, so does the temperature of the handle, which causes the handle to be too hot for the user to grip.

To fulfill the different cooking needs, the manufactures offer a variety of cookwares, for example, a ceramic cookware, a stainless-steel pot, and a cast iron pot, etc. Here the cast iron pot is used as an example of the cookware. During cooking, the cast iron pot is heated on the stove to sear the surface of the food (e.g. the steak) in the iron pot, and then the food along with the cast iron pot is put into the oven for baking until the cooking is completed. However, in order to complete the cooking above, it is necessary to choose an oven with sufficient internal space to receive the whole cast iron pot, which is not convenient for every user. In addition, the handle of the cast iron pot will become too hot for the user to grip and move the pot after the cooking is completed.

Therefore, the conventional cookware is not perfect, there is still room for improvement.

BRIEF SUMMARY OF THE INVENTION

In view of the above, the purpose of the present disclosure is to provide a cookware article having a removable handle to improve the use flexibility effectively.

The present disclosure provides a cookware article including a container, at least one fixed handle, and a removable handle. The at least one fixed handle has a fixed portion mounted on a side wall of the container, a grip portion connected to the fixed portion, and an opening. The removable handle is detachable engaged with the fixed handle by passing through the opening and includes a grip segment as well as an engaging segment. The engaging segment includes a first abutting portion, a second abutting portion, and a connecting portion. An end of the connecting portion is adjacent to the first abutting portion, the other end of the connecting portion is adjacent to the second abutting portion. When the removable handle is engaged with the at least one fixed handle, the first abutting portion is abutted against the fixed portion, and the second abutting portion is abutted against the grip portion, and the connecting portion is through the opening. Therefore, the removable handle may support the container.

The advantage of the present disclosure is that by the detachable of the handle design, when the removable handle is detached from the fixed handle, the space occupied by the cookware article may decrease, and a user may lift up the cookware through gripping the fixed handle, which increases the using flexibility of the cookware article. Furthermore, when the container is used in cooking without the removable handle, it prevents the heat energy from transferring to the removable handle.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
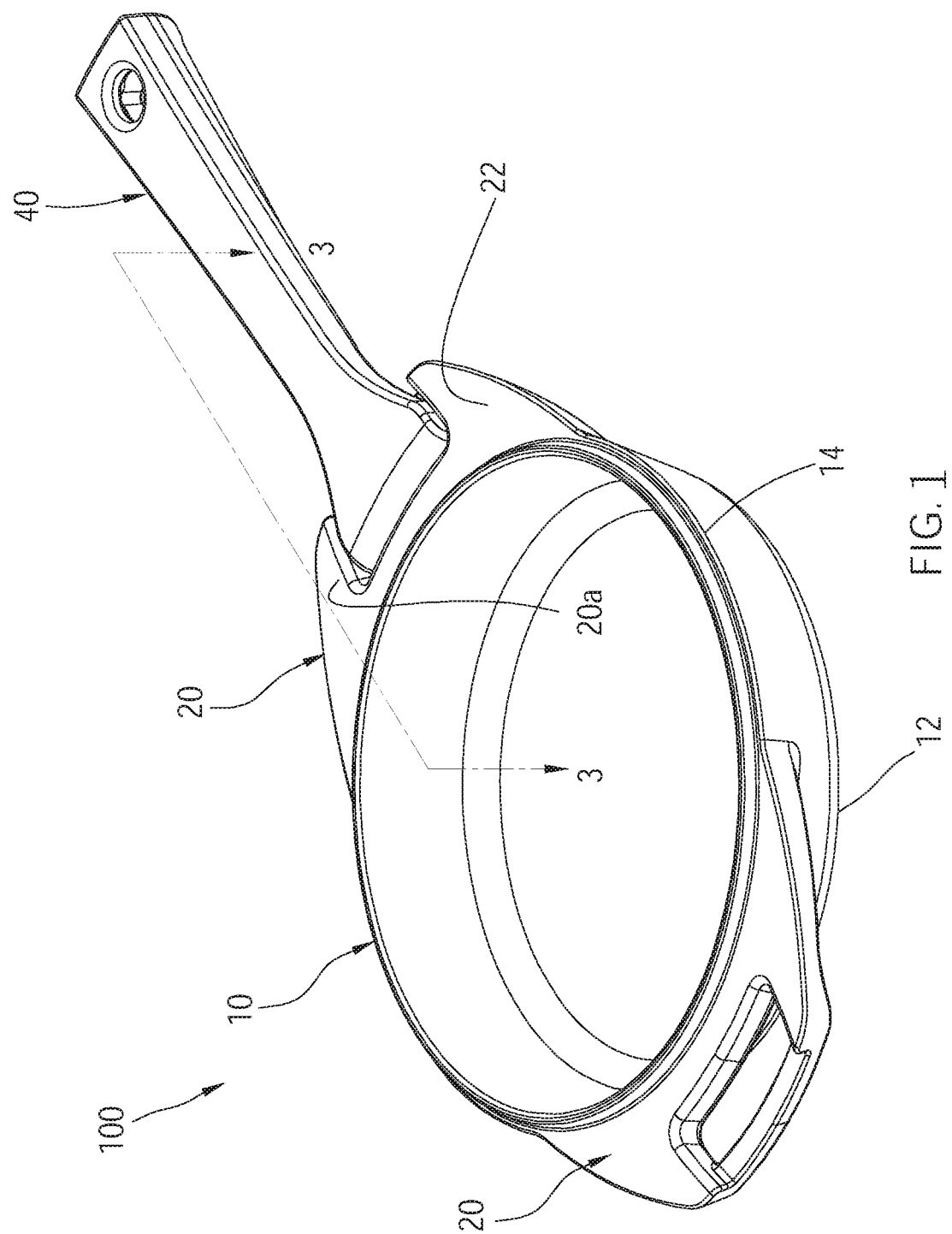
FIG. 1 is a perspective view showing the cookware article according to a first embodiment of the present disclosure.

A cookware article 100 according to a first embodiment of the present disclosure is shown in FIG. 1 to FIG. 4. The cookware article 100 includes a container 10, at least one fixed handle 20, and a removable handle 40.

The container 10 has a container bottom 12 and a side wall 14 formed integrally as a monolithic unit. The container bottom 12 is flat and round in shape. The side wall 14 extends upward from the periphery of the container bottom 12 and has convexly curved surface protruding outward. In the present embodiment, the container 10 may be made of a metal material, for example, cast iron, aluminum, etc. and may also be made of a non-metal material, for example, glass, ceramic, etc.

In the present embodiment, there is a pair of the fixed handles 20 mounted respectively on two opposite sides of the side wall 14. To describe more clearly, the fixed handles 20 and the side wall 14 are formed integrally. In practice, the fixed handles 20 may be mounted on the side wall 14 by screwing. Both the fixed handles 20 have the same structure so only one of the fixed handles 20 is described in the present embodiment.

The fixed handle 20 has an opening 20c, a fixed portion 22, and a grip portion 24. The opening 20c is through a top surface 20a and a bottom surface 20b of the fixed handle 20. The fixed handle 20 is mounted on the side wall 14 through its fixed portion 22. In the present embodiment, the opening 20c is between the fixed portion 22 and the grip portion 24 and is curved in shape for a user's fingers to pass through so the user may grip the grip portion 24 to lift the container 10. In the present embodiment, a top face of the grip portion 24 is below that of the fixed portion 22 in a vertical direction.

Figure 3:
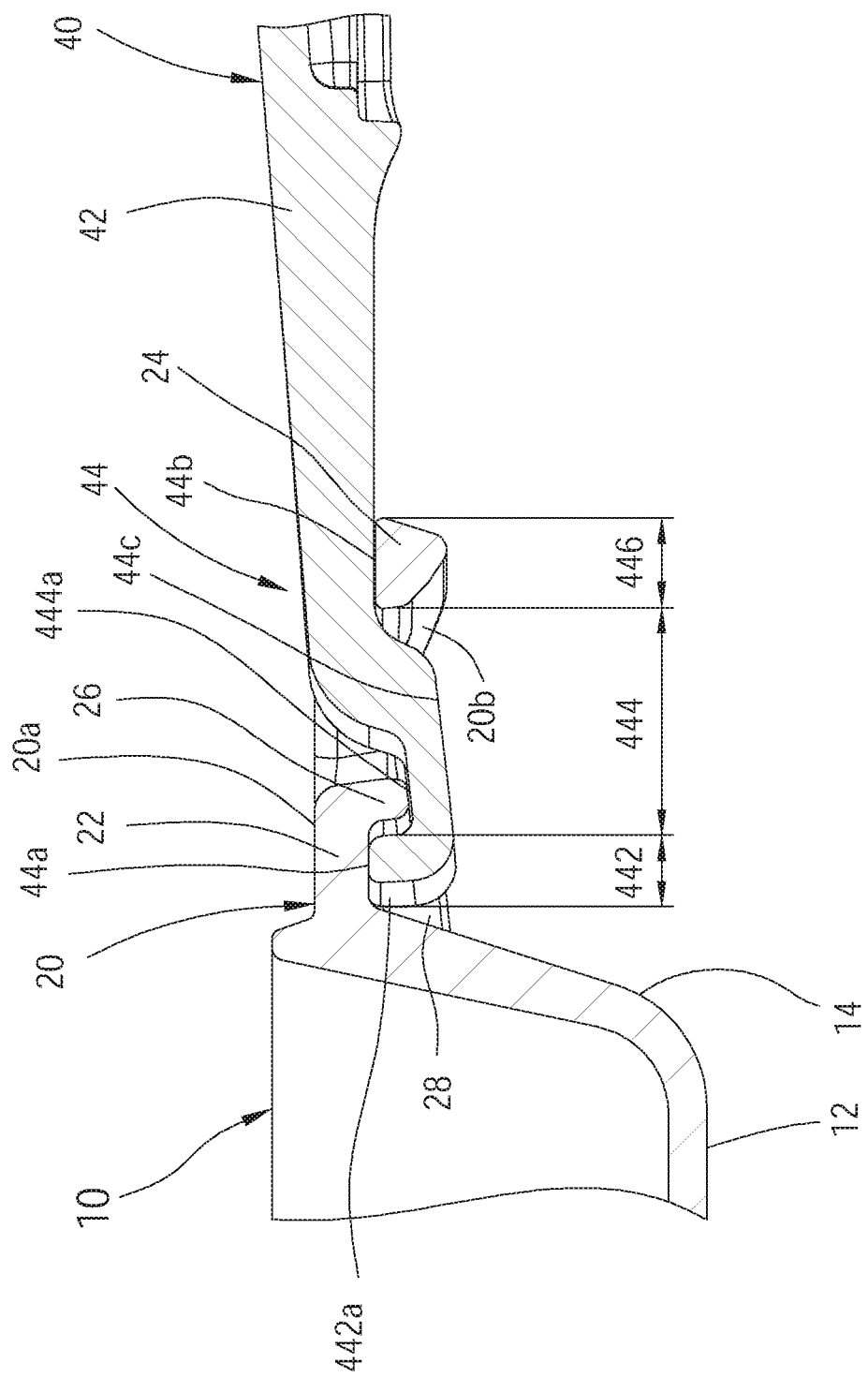
FIG. 3 is a partially cross-sectional view taken along the line 3-3 in FIG. 2.
Figure 4:
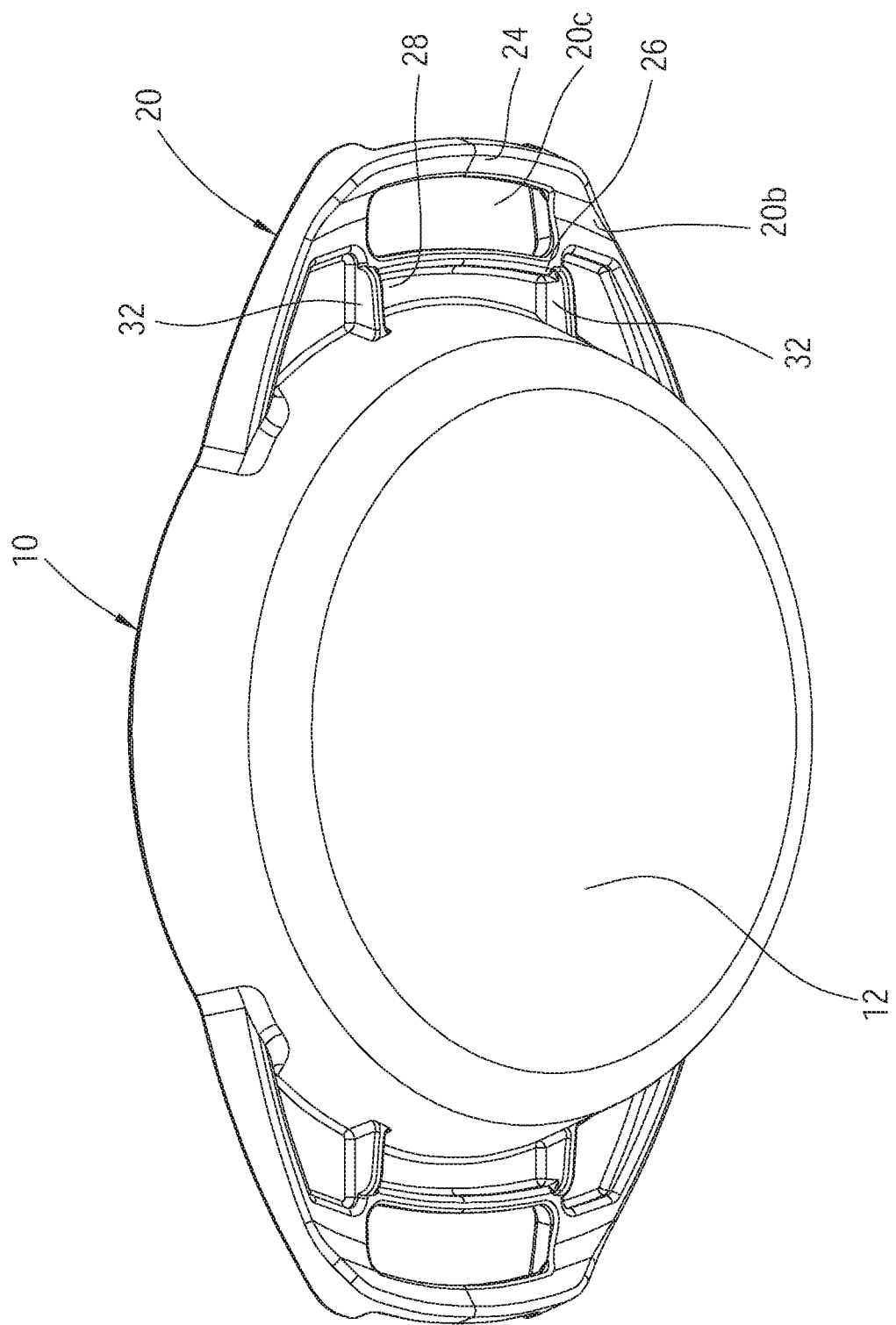
FIG. 4 is a bottom perspective view of the cookware article according to the first embodiment of the present disclosure.

Referring to FIG. 3 and FIG. 4, in the present embodiment, the fixed handle 20 further has a protrusion 26. The protrusion 26 is formed by protruding downward from a bottom face of the fixed portion 22. An engagement recess 28 is formed between the protrusion 26 and the side wall 14 of the container 10. In other words, the bottom face of the fixed portion 22 has the engagement recess 28 set back further than the other parts of the bottom face of the fixed portion 22. Two opposite sides of the engagement recess 28 are provided with a stop member 32 respectively.

The removable handle 40 includes a grip segment 42 and an engaging segment 44 adjacent to the grip segment 42. The grip segment 42 is adapted to be gripped by the user. A thickness of the grip segment 42 defined in the vertical direction is becoming thicker toward a direction away from the engaging segment 44 for the user to hold the removable handle 40 firmly. In the present embodiment, the removable handle 40 may be made of a metal material, for example, cast iron, aluminum, etc. and may also be made of a non-metal material, for example, wood, bakelite, etc.

The engaging segment 44 has a first abutting portion 44a, a second abutting portion 44b, and a connecting portion 44c between the first abutting portion 44a and the second abutting portion 44b. The removable handle 40 is detachably engaged with the fixed handle 20 through the engaging segment 44. During engagement of the engaging segment 44 and the fixed handle 20, the first abutting portion 44a and the connecting portion 44c pass through the opening 20c of the fixed handle 20 sequentially, and then the grip segment 42 of the removable handle 40 is pushed downward (shown in FIG. 3) until the second abutting portion 44b is downward abutted against the top face of the grip portion 24 and the removable handle 40 is substantially parallel to the container bottom 12. At this time, the engaging segment 44 has already engaged with the fixed handle 20, in which the first abutting portion 44a is abutted against the bottom face of the fixed portion 22 upward and the connecting portion 44c is substantially located in the opening 20c.

Figure 2:
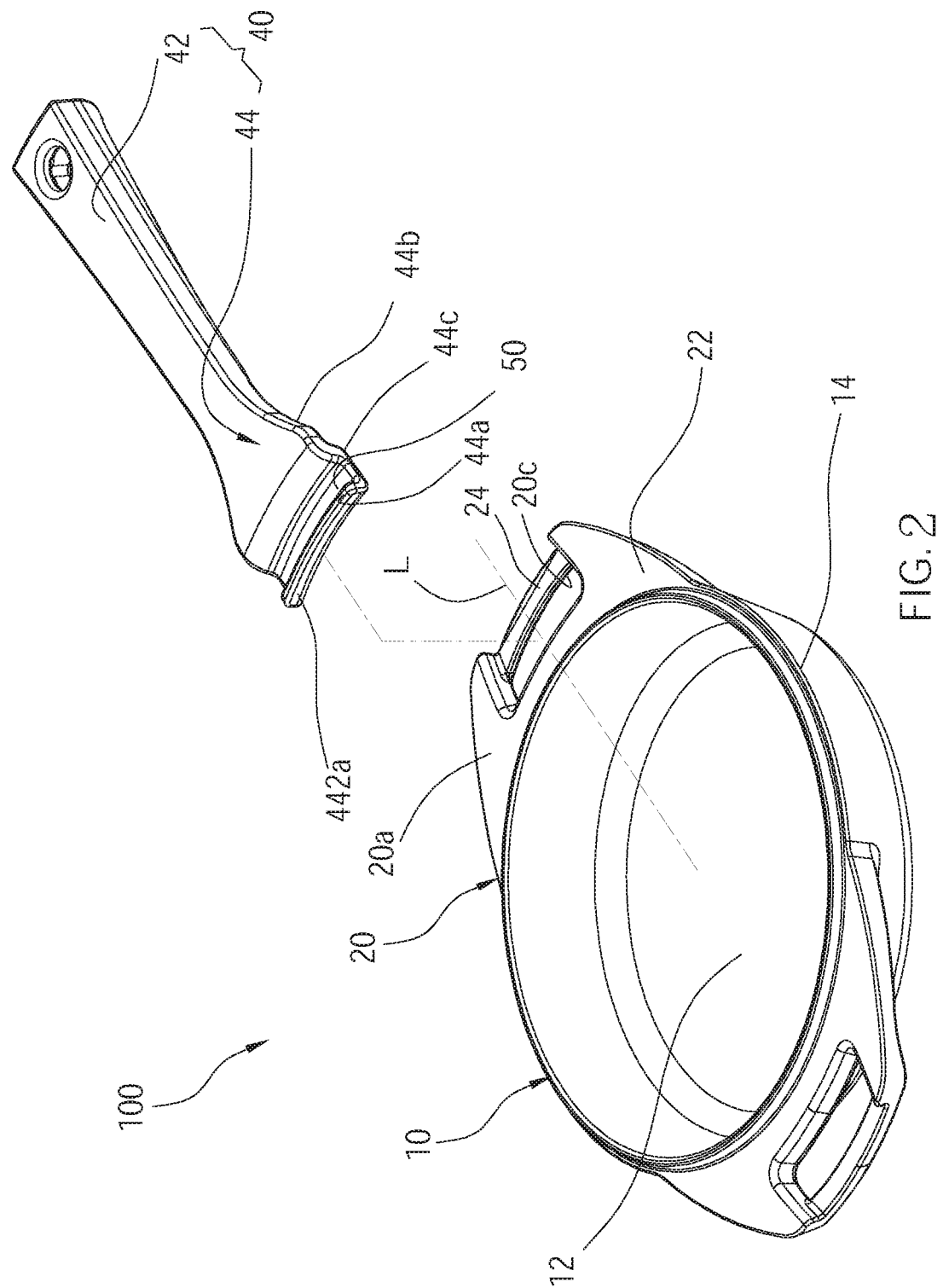
FIG. 2 is an exploded view showing the cookware article according to the first embodiment of the present disclosure.

To describe more clearly, the engaging segment 44 of the removable handle 40 has a first segment 442, a second segment 444, and a third segment 446 along with an axial direction L (shown in FIG. 2). The first segment 442 is near the container 10 and has a front surface 442a away from the grip segment 42. The front surface 442a is concave in shape. A top face of the first segment 442 forms the first abutting portion 44a. The second segment 444 forms the connecting portion 44c and has a groove 444a on its top face. The groove 444a has two open ends. The third segment 446 is adjacent to the grip segment 42 and its bottom face forms the second abutting portion 44b. A width of the third segment 446 is tapering toward the grip segment 42 (as shown in FIG. 2). When the removable handle 40 is engaged with the fixed handle 20, the protrusion 26 is located in the groove 444a, and the first segment 442 is located in the engagement recess 28 for the first abutting portion 44a to abutted against the bottom face of the fixed portion 22 upward, so that the protrusion 26 may confine the first segment 442 so as to limit the movement range of the first segment 442 in the axial direction L. Such design prevents the removable handle 40 from falling off the fixed handle 20 accidentally. The stop member 32 at two opposite sides of the engagement recess 28 may also confine the first segment 442 and the first abutting portion 44a within the engagement recess 28 so as to limit the movement range of the first segment 442 in a direction vertical to the axial direction L.

By the design that the top face of the grip portion 24 is lower than that of the fixed portion 22, after the removable handle 40 is engaged with the fixed handle 20, the top faces of the grip segment 42 and the engaging segment 44 are substantially in a same horizontal, which means that the grip segment 42 does not extend upward with respect to the engaging segment 44 too much. Furthermore, a top face of a portion of the fixed portion 22 adjacent to the grip portion 24 is also above the top face of the grip portion 24 in the vertical direction, which also confines the removable handle 40 in the grip portion 24 so as to prevent the removable handle 40 from deviating away from the axial direction L.

In practice, the container 10 may not be provided with the protrusion 26. In such design, the first abutting portion 44a still can be abutted against the bottom face of the fixed portion 22.

Figure 5:
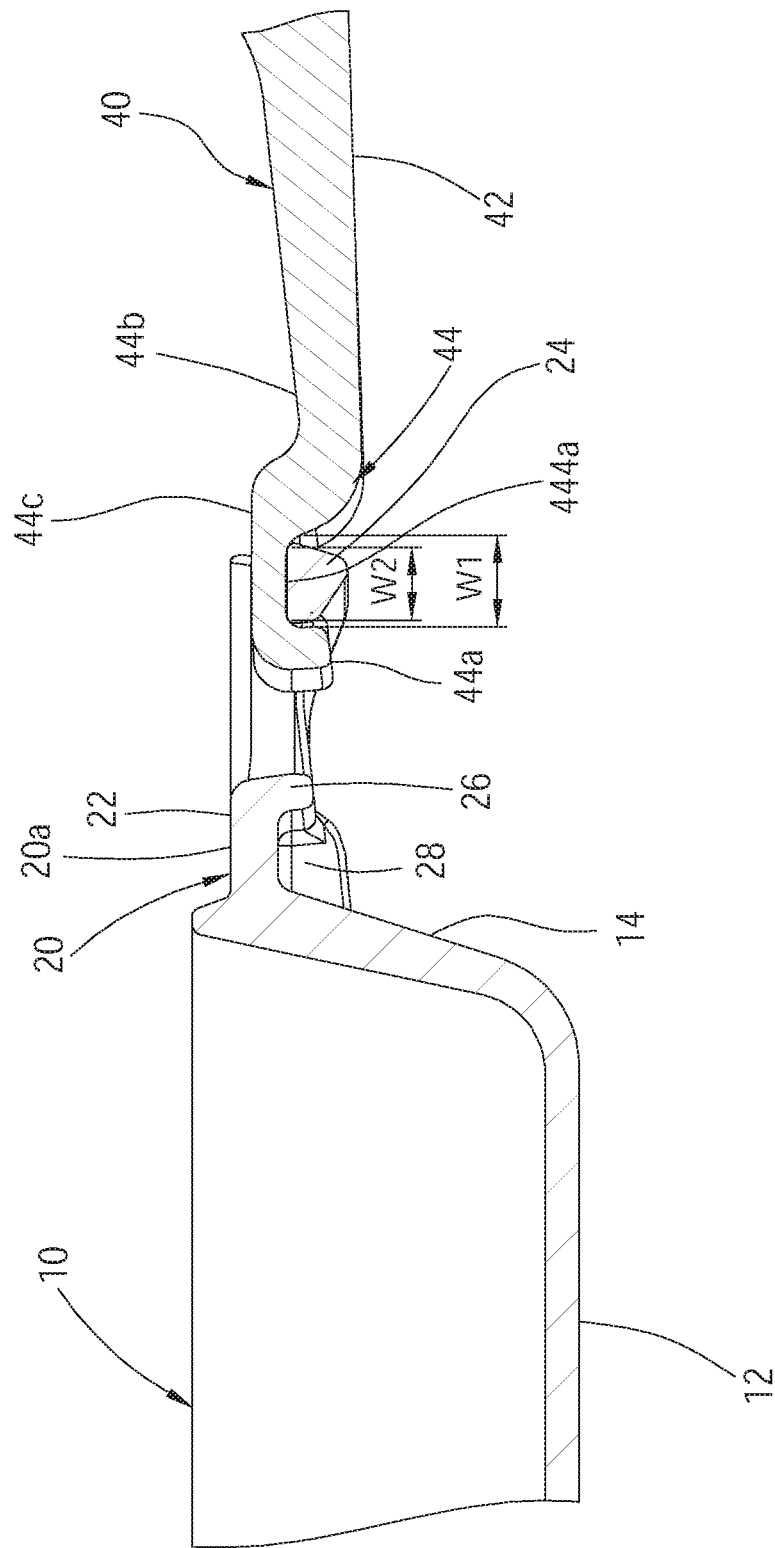
FIG. 5 is a partially cross-sectional view showing that the removable handle is inversely engaged with the grip portion according to the first embodiment of the present disclosure.

Referring to FIG. 5, the removable handle 40 is inversely engaged with the fixed handle 20. To achieve the inverse engagement, the groove 444a has a first width W1 in the axial direction L, and the grip portion 24 has a second width W2 less than the first width W1 in the axial direction L so that the grip portion 24 can be received in the groove 444a. With such design, after being detached from the fixed handle 20, the removable handle 40 may be inversely engaged with the fixed handle 20. For example, when the container 10 is put in an oven for baking, the user may inversely engage the removable handle 40 with the fixed handle 42 and then pull or push the removable handle 40 to move the container 10.

Figure 6:
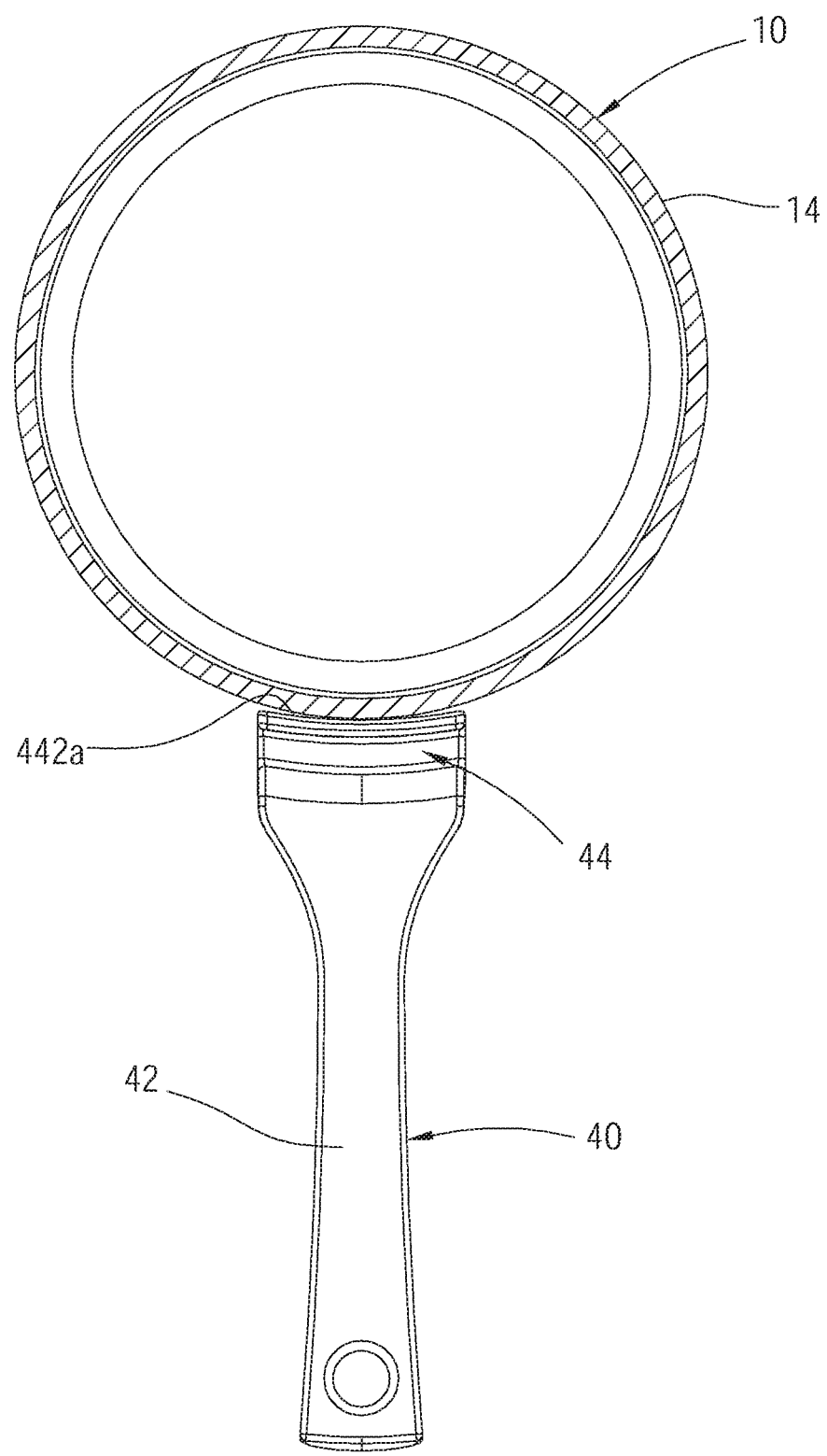
FIG. 6 is a schematic diagram showing that the front surface of the engaging surface with concave curvature matches the side wall with convexly curved surface according to the first embodiment of the present disclosure.

Referring to FIG. 6, the front surface 442a of the engaging segment 44 is concave curved to match the convexly curved surface of the side wall 14 such that when the removable handle 40 is separated from the fixed handle 20 and used to push the container 10, the front surface 442a can fit the side wall 14 so as to avoid the deviation of the container 10 during pushing.

Figure 7:
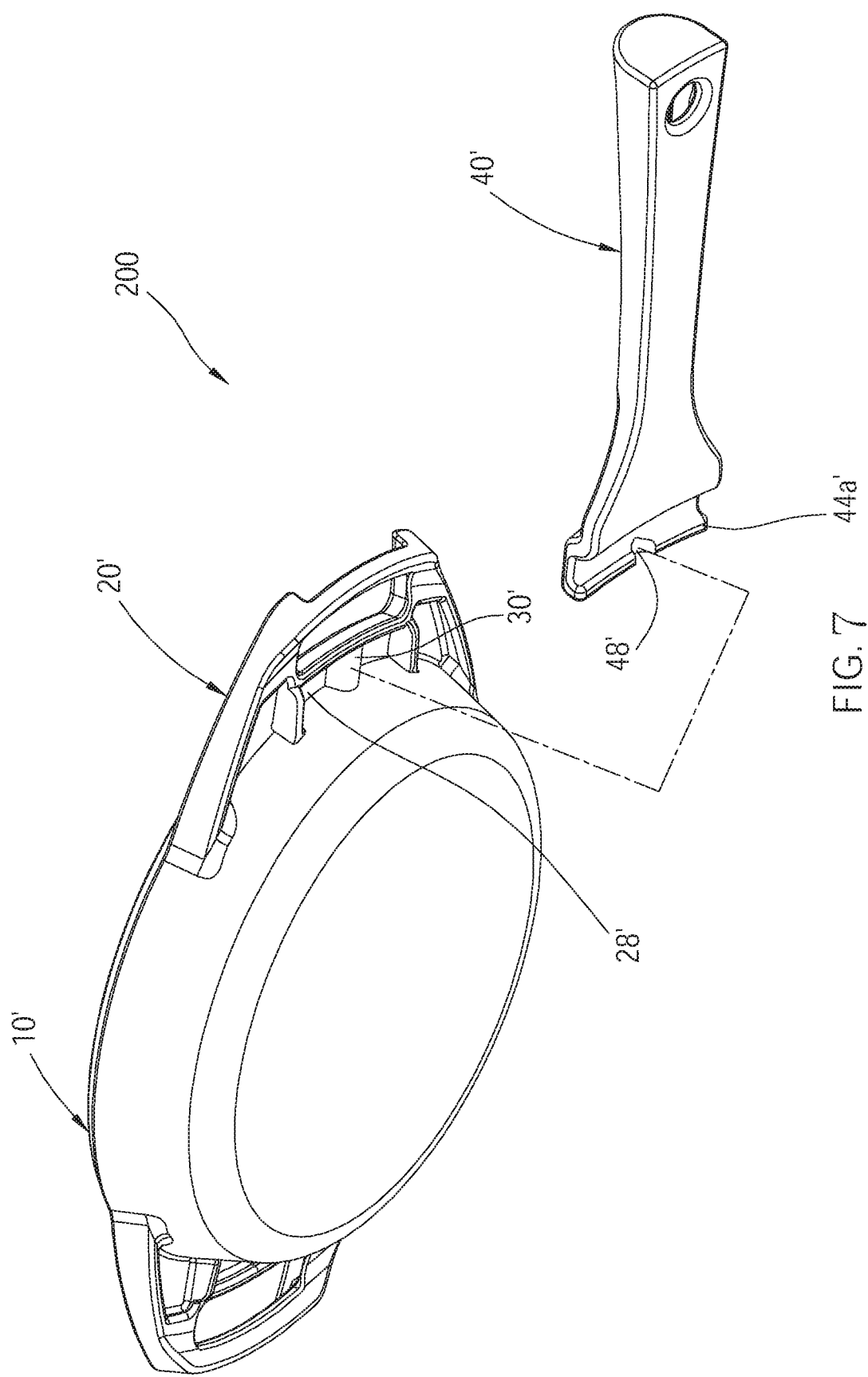
FIG. 7 is an exploded view showing the cookware article according to a second embodiment of the present disclosure.
Figure 8:
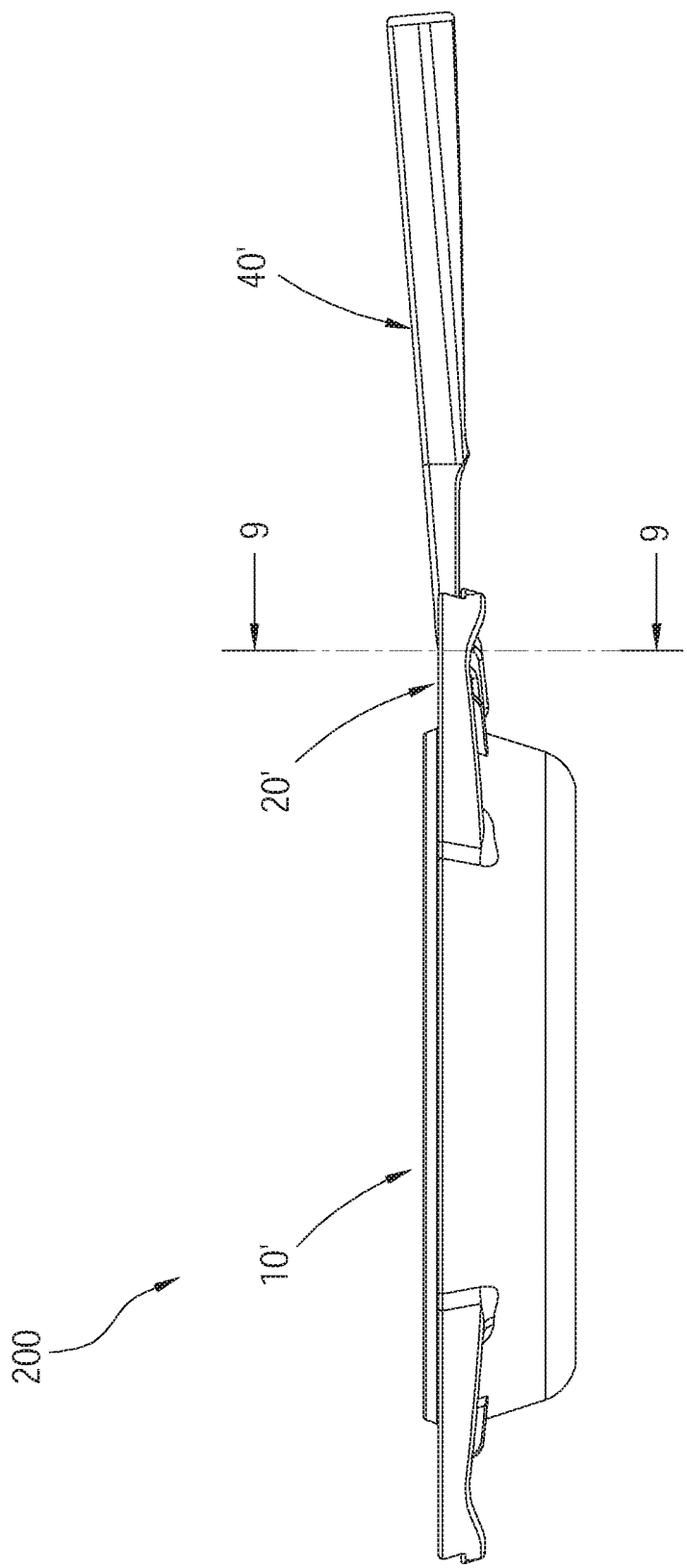
FIG. 8 is a side perspective view showing the cookware article according to the second embodiment of the present disclosure.
Figure 9:
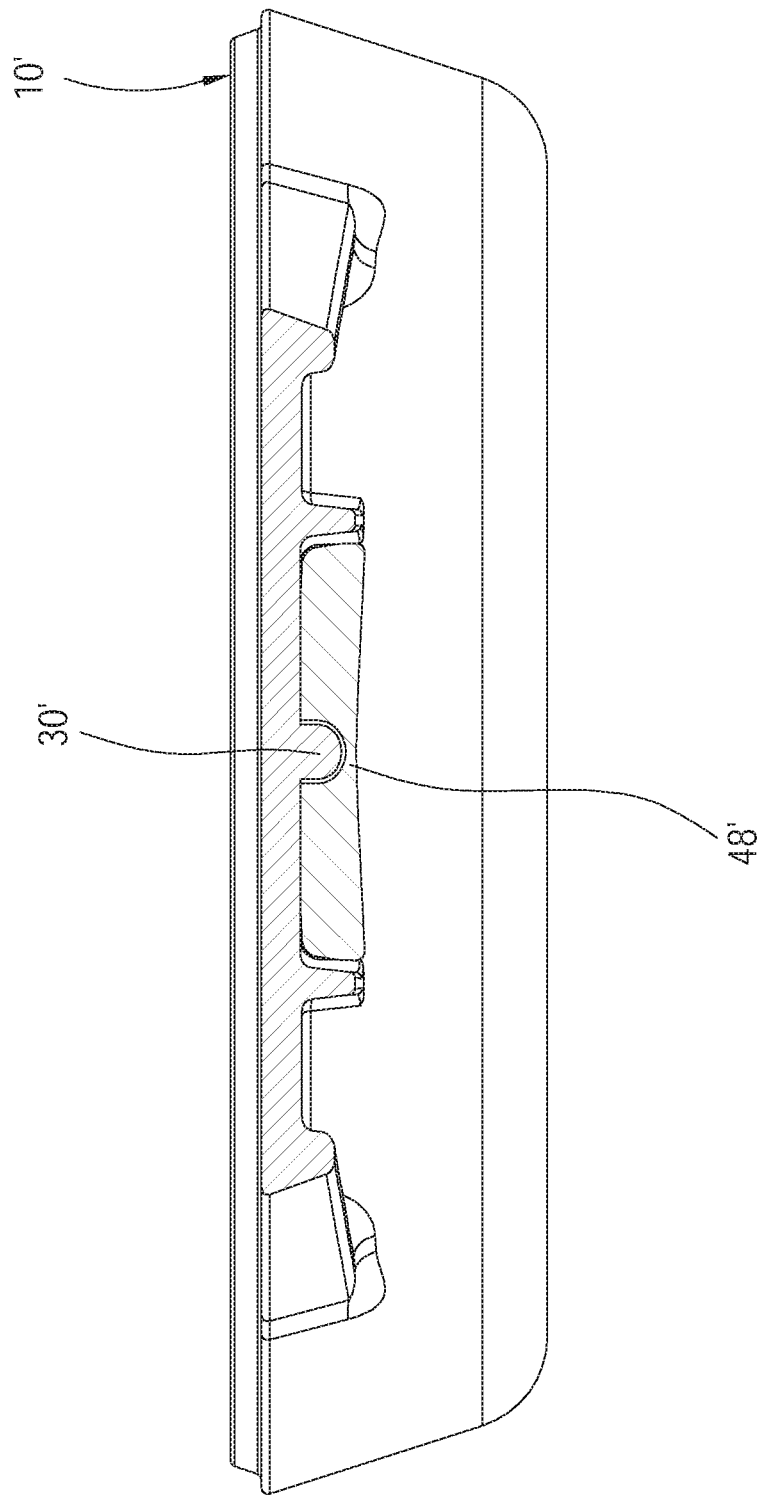
FIG. 9 is a cross-sectional view taken along line 9-9 in FIG. 8.

Referring to FIG. 7 to FIG. 9, a cookware article 200 according to a second embodiment of the present disclosure has substantially the same structure as the cookware article 100 according to the first embodiment, except that the cookware article 200 of the present embodiment further includes a positioning member 30' provided in the engagement recess 28'. The positioning member 30' in the engagement recess 28' is vertical to the side wall 14 and the protrusion 26. In the present embodiment, the first abutting portion 44a' of the removable handle 40' has a positioning recess 48' concavely recessed into the first abutting portion 44a'. The positioning recess 48' serves to receive the positioning member 30'. By such design, when the removable handle 40' is engaged with the fixed handle 20', the positioning member 30' can extend into the positioning recess 48' and can be confined in the positioning recess 48', so that the container 10' can be firmly engaged with the removable handle 40' and will not sway or wobble during using.

According to the above description, the cookware article of the present disclosure is designed with a removable handle detachable from the fixed handle, which decreases the space for accommodating the cookware article. Moreover, after the removable handle is detached from the container, the user may lift up the container through gripping the fixed handle, which increases the using flexibility of the cookware. Furthermore, the removable handle may be detached before the cookware article is heated, so the heat energy will not be transferred to the removable handle, which improves the inconvenience of using the conventional cookware.

It must be pointed out that the embodiments described above are only some embodiments of the present disclosure. All equivalent structures which employ the concepts disclosed in this specification and the appended claims should fall within the scope of the present invention.

What is claimed is:

1. A cookware article, comprising:
   a container having a side wall;
   at least one fixed handle having a fixed portion mounted on the side wall, a grip portion connected to the fixed portion, and an opening therein between the fixed portion and the grip portion; and
   a removable handle including a grip segment and an engaging segment detachably engaged with the at least one fixed handle, wherein the engaging segment has a first abutting portion, a second abutting portion, and a connecting portion between the first abutting portion and the second abutting portion, and when the removable handle is engaged with the at least one fixed handle, the first abutting portion is abutted against the fixed portion, the second abutting portion is abutted against the grip portion, and the connecting portion passes through the opening;
   wherein the at least one fixed handle has a protrusion formed at a bottom face of the fixed portion; an engagement recess is formed between the protrusion and the side wall of the container; the connecting portion has a groove; and when the removable handle is engaged with the at least one fixed handle, the protrusion is located in the groove, and the first abutting portion is located in the engagement recess.

2. The cookware article as claimed in claim 1, wherein a top face of the grip portion is below that of the fixed portion in a vertical direction.

3. The cookware article as claimed in claim 1, wherein a portion of the fixed portion adjacent to the grip portion has a top face above the grip portion in a vertical direction.

4. The cookware article as claimed in claim 1, wherein the side wall of the container has a convexly curved surface; the engaging segment has a front surface away from the grip segment and concave in shape; and when the removable handle is detached from the at least one fixed handle and used to push the container, the front surface is abutted against an external surface of the side wall.

5. The cookware article as claimed in claim 1, wherein after the removable handle is detached from the at least one fixed handle, the groove is provided to receive the grip portion.

6. The cookware article as claimed in claim 5, wherein the groove has a first width in an axial direction; the grip portion has a second width in the axial direction; and the second width is less than the first width.

7. The cookware article as claimed in claim 1, wherein the at least one fixed handle has a positioning member in the engagement recess; the first abutting portion of the removable handle has a positioning recess; and when the removable handle is engaged with the at least one fixed handle, the positioning member is located in the positioning recess.

8. The cookware article as claimed in claim 1, wherein two opposite sides of the engagement recess are provided with a stop member respectively to confine the first abutting portion in the engagement recess.

* * * * *